Sept. 2, 1941.  C. J. BEAVER ET AL  2,254,958
FLUID-TIGHT JOINT
Filed Feb. 28, 1938
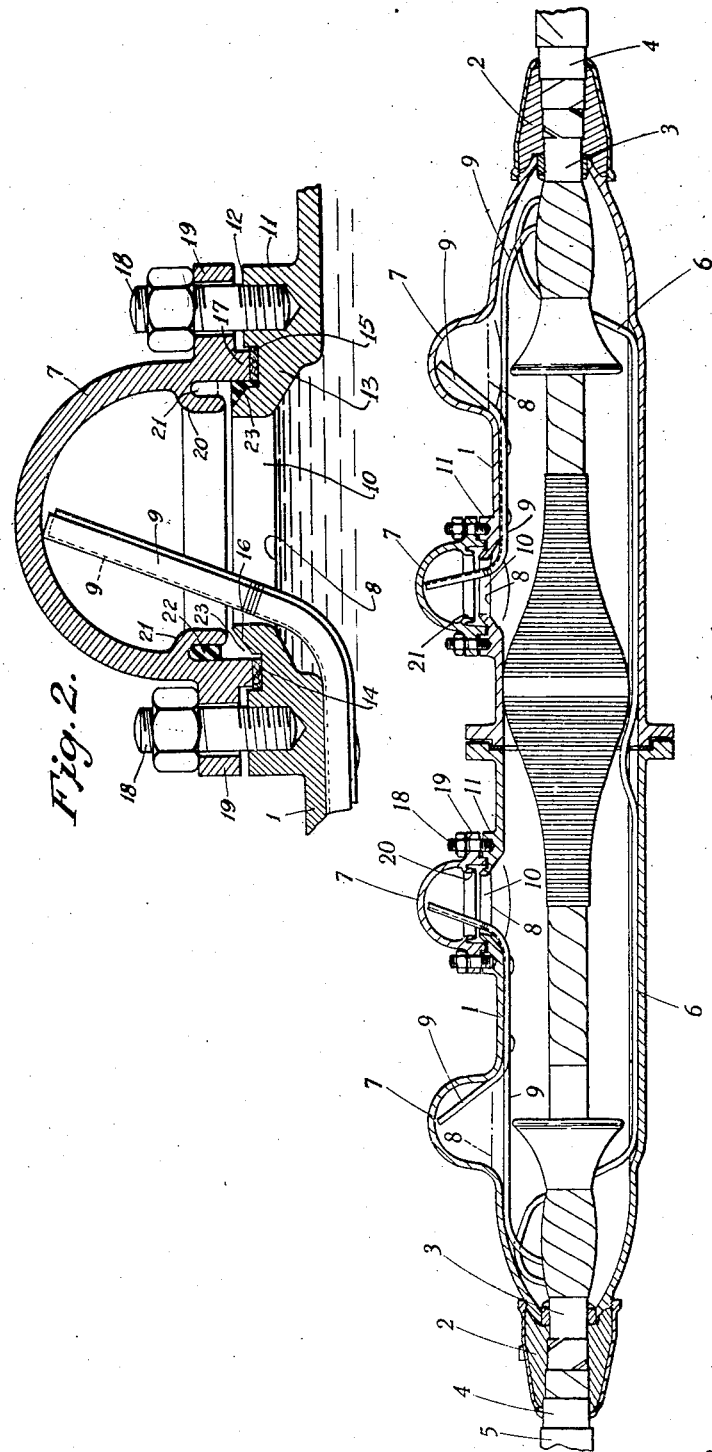
INVENTORS
CHARLES JAMES BEAVER
and EDWARD LESLIE DAVEY
By Stebbins, Blenko & Parmelee
ATTORNEYS Patented Sept. 2, 1941

2,254,958

UNITED STATES PATENT OFFICE 2,254,958

FLUID-TIGHT JOINT

Charles James Beaver, Bowdon, and Edward Leslie Davey, Timperley, England, assignors to W. T. Glover and Company Limited, Trafford Park, Manchester, England, a British company Application February 28, 1938, Serial No. 192,984
In Great Britain March 17, 1937

4 Claims. (Cl. 220—46)

This invention relates to the closing of apertures in vessels containing or destined to contain fluid under pressure. The closure of such an aperture involves making a joint between the closure member for the aperture and the wall of the vessel. This is frequently done with the aid of a gasket, or washer or packing inserted between appropriately shaped surfaces on the two parts and compressed by drawing the parts together, by means of screws, for instance. This form of joint (hereinafter for the sake of brevity spoken of as a compression joint) is not always satisfactory and is liable to become ineffective after a time and permit the escape of fluid, especially when the fluid is gaseous. It is the object of this invention to provide an improved form of compression joint that is free from the disadvantage referred to above. In the improved construction the inner edge of the compression joint between the wall of the vessel and the closure member is separated from the fluid in the vessel by a body of viscous or solid material impervious to the fluid in contact with and exerting pressure upon it. To this end the lower of the two members making the joint (usually though not necessarily, the vessel) is provided with a rib which extends around the joint face and on the inside thereof and projects in an upward direction beyond the joint so as to form the inner wall of a circumferential channel of which the remaining portion of the wall is formed in part by the inner edge of the compression joint. The interior of the upper of the two members, usually the closure member, is shaped to form a reservoir into which the fluid-impervious sealing material may be introduced before the two members are brought together and from which it is transferred to the circumferential channel by gravity after the joint is made. The reservoir is preferably formed by providing in the internal surface of the upper member an annular groove extending around the joint surface on the inside thereof. This groove may be an inverted image of the sealing channel provided on the lower member but it is preferred to make the capacity of the reservoir greater than that of the sealing channel which it feeds.

The choice of sealing material will depend upon the nature and temperature of the fluid in the vessel. In some cases an oil-resin compound may be used that at the normal working temperatures of the vessel is merely sufficiently viscous to be retained in the reservoir until the compression joint is made. It will generally be more satisfactory however to use a highly viscous or solid oil or compound which liquefies at a slightly higher temperature than the operating temperature of the vessel. In certain cases it may be preferable to use a metal or alloy having a melting point that is lower than a temperature that would damage the joint packing, the vessel or its contents. Where a metal is employed as the sealing material it may be advisable in order to obtain good contact between the material and the surfaces of the sealing channel to coat these surfaces previously with a suitable metal, for instance, tin, and/or a flux.

Preparatory to making the improved joint the requisite amount of sealing material is introduced in to the reservoir, for instance, by melting the material and pouring it into the reservoir, the member having the reservoir being in the inverted position. The closure member is then placed in position and the compression joint made. The disposition of the two members being such that the reservoir is above the sealing channel, the sealing material, if a viscous body, flows from the reservoir and is guided by a surface on the upper member into the sealing channel. Where the material is normally a solid or a liquid that is too viscous to flow from the reservoir within a reasonable period of time, heat is applied to the member having the reservoir to melt or reduce the viscosity of the material, which then flows into the sealing channel where it is allowed to cool and solidify or regain the required degree of viscosity, as the case may be.

The invention is particularly useful in connection with the closing of joint sleeves and terminal boxes for high tension cables operating under an internal gas pressure of from 50–350 lbs. per square inch and by way of example a joint sleeve closed in accordance with the invention will now be described with the aid of the accompanying drawing in which Figure 1 is a longitudinal section of the joint sleeve, the two jointed cables being shown in elevation since the construction of the cable and of the actual conductor joint forms no part of the present invention, and Figure 2 is a fragmental longitudinal section on an enlarged scale showing in greater detail the construction of one of the detachable expansion domes.

Referring now to the drawing it will be seen that the sleeve is jointed at its ends by means of cast plumbed joints 2 to the inner and outer lead sheaths 3 and 4, respectively, of the two cables 5. The interior of the one cable is placed in communication with the interior of the other cable by means of a pipe 6. The upper part of the sleeve 1 is shaped to form a number of domes 7 to provide for the expansion of the compound with which the sleeve is filled to the level indicated at 8. This compound, which is not shown in Figure 1, is maintained under pressure by placing the upper part of the interior of each dome in communication with the interior of one or other of the cables 5 by means of pipes 9. Two of the domes are made detachable so as to provide an aperture 10 of appropriate size for the purpose of introducing the compound into the sleeve. Around the aperture the wall of the sleeve is thickened locally to form an annular boss 11. In the upper surface 12 of the annular boss is formed an annular recess 13 in which a packing ring 14 is inserted. The outer circumferential wall 15 of this recess is preferably vertical, the inner wall 16 of the recess is vertical for a distance approximately equal to the thickness of the packing ring 14 and then inclines away from the recess to form a conical surface. The height of the conical portion of the inner circumferential wall is about twice that of the cylindrical portion. The base wall of the dome constituting the cover of the aperture forms a spigot 17 which enters the recess 13 in the surface 12 of the boss. By means of screws 18 or the like passing through an outwardly extending circumferential flange 19 on the dome and entering screw threaded holes in the boss 11 on the sleeve, the dome and sleeve are drawn together to make, with the aid of the packing ring 14, a compression joint. On the inner surface of the dome and at a short distance from the edge thereof there is formed a circumferential flange 20 which extends first inwardly and then downwardly until it approaches the upper edge of the inner wall 16 of the recess in the boss on the sleeve. There is thus formed an inverted annular groove 21 between the wall of the dome and the inwardly extending flange 20 thereof. This groove constitutes a reservoir which is partly filled, as shown to left of Figure 2, with hot, normally viscous, or solid cable compound 22 a short time before the dome is placed in position on the sleeve. When the compression joint has been made the wall of the dome is warmed with a blow lamp or in any other convenient way sufficiently for the compound 22 in the groove 21 to become melted again, whereupon the compound, guided by the flange 20 flows into the annular channel 23 formed between the lower extremity of the dome wall and the inner wall 16 of the recess in the boss on the sleeve. Upon cooling, the compound regains its initial viscosity and forms an effective gas-tight seal as shown to the right of Figure 2. The pressure exerted by the gas in the dome merely results in the compound in the lower channel being forced more tightly into engagement with the bottom and side walls of the channel and therefore in increasing the effectiveness of the seal.

It will be appreciated that the improved method of ensuring a perfectly gas-tight joint presents the considerable advantage over methods, such as plumbing, soldering or welding the exterior edge of the joint, in that in the improved method, the internal pressure generated by the heat required to melt down the sealing material is beneficial inasmuch as the latter, being on the high pressure side of the joint, is forced into the joint, whereas in the plumbing, soldering, or welding method, which entails the application of considerable heat, venting is essential, to prevent the molten metal, which is necessarily on the low pressure side of the joint, from being blown away from the joint by the internal pressure.

What we claim as our invention is:

1. A method of making a compression joint between the wall of a vessel and the closure member for an aperture therein secure against the escape of fluid under pressure contained in the vessel, said method comprising introducing into a reservoir within the upper member a body of sealing material, which at the operating temperature of the vessel is impervious to the pressure fluid with which it will come into contact, subsequently making the compression joint and thereafter applying heat to the upper of the two jointed members to cause the sealing material to flow from the reservoir by the action of gravity into a peripheral channel of which a part of the wall is formed by the inner edge of the compression joint.

2. Apparatus for sealing a compression joint between a vessel for containing fluid under pressure having an aperture therein and a closure member for the aperture, which includes an open channel around the interior wall of the vessel with its bottom adjacent the inner side of said joint, the outer wall of said channel being formed by the inner wall of the closure above said joint and the inner wall of the channel extending upwardly above the level of the top of the joint, a second channel located in the closure member opening into the first channel and being positioned above the joint whereby sealing material contained in the second channel may flow into the first channel and be forced against the inside of the compression joint by the fluid in the vessel.

3. Apparatus for sealing a compression joint between a vessel for containing fluid under pressure having an aperture therein and a cover for the aperture comprising a rib extending inwardly from the lower of the two members forming the joint and upwardly above the level of the top of the joint to form a channel, the outer wall of the channel being formed by the inner edge of the joint and a portion of the inside wall of the other member, and a rib extending inwardly from the upper member forming the joint and downwardly towards the first rib to form a channel opening into the first channel whereby sealing material contained in the second channel may flow into the first channel and cover the inside of the compression joint.

4. Apparatus for sealing a compression joint between two members which are in substantially vertical alignment, one member being a vessel for containing fluid under pressure having an aperture therein, the other member being a closure for the aperture, said vessel having a peripheral seat about said opening on which said closure rests, and forms a joint between the two members, the lower of said members having an inwardly projecting portion adjacent said joint forming with said other member an upwardly opening channel adjacent the inner side of said joint, the bottom of said channel being in direct communication with said joint, and a reservoir located in the upper member opening into the said channel and being positioned above the joint, whereby sealing material contained in the said reservoir may flow into the said channel, and be forced against the inside of the compression joint by fluid under pressure in the vessel.

CHARLES JAMES BEAVER.
EDWARD LESLIE DAVEY.